(12) United States Patent
Lupu

(10) Patent No.: US 10,099,798 B2
(45) Date of Patent: Oct. 16, 2018

(54) SYSTEM AND METHOD OF AIRPLANE CONVERSION FOR IN-FLIGHT REFUELING

(71) Applicant: ISRAEL AEROSPACE INDUSTRIES LTD., Lod (IL)

(72) Inventor: Abraham Lupu, Rehovot (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 14/387,491

(22) PCT Filed: Mar. 21, 2013

(86) PCT No.: PCT/IL2013/050285
§ 371 (c)(1),
(2) Date: Sep. 23, 2014

(87) PCT Pub. No.: WO2013/153549
PCT Pub. Date: Oct. 17, 2013

(65) Prior Publication Data
US 2015/0076286 A1    Mar. 19, 2015

Related U.S. Application Data

(60) Provisional application No. 61/622,125, filed on Apr. 10, 2012.

(51) Int. Cl.
*B64D 39/00*   (2006.01)
*B64D 45/00*   (2006.01)
*B64F 5/00*    (2017.01)

(52) U.S. Cl.
CPC ............ *B64D 39/00* (2013.01); *B64D 45/00* (2013.01); *B64F 5/00* (2013.01); *Y10T 29/49716* (2015.01)

(58) Field of Classification Search
CPC ............ B64D 39/00; B64F 2700/6234; B64C 2211/00; B64C 1/068
(Continued)

(56) References Cited

U.S. PATENT DOCUMENTS 2,692,102 A * 10/1954 Cobham ............... B64D 39/00
244/135 A
2,859,002 A * 11/1958 Leisy .................... B64D 39/00
244/135 R (Continued)

FOREIGN PATENT DOCUMENTS

WO   WO 2006085923   8/2006
WO   WO 2012030347   3/2012

OTHER PUBLICATIONS

International Search Report and Written Opinion for International Application No. PCT/IL2013/050285 dated Jul. 1, 2013.

*Primary Examiner* — Richard R Green
*Assistant Examiner* — Michael A. Fabula
(74) *Attorney, Agent, or Firm* — Dorsey & Whitney LLP

(57) ABSTRACT

A refueling airplane converted from a non-refueling airplane having an original tail section and an original tail-strike pitch attitude. The refueling airplane comprises the original tail section and a recess formed therein, both constituting a modified tail section. The recess is configured to at least partially accommodate therewithin a refueling boom. The refueling boom is configured to be mounted to the modified tail section, such that a tail-strike pitch attitude of the refueling airplane, when said refueling boom is mounted thereto, is equal to or greater than the original tail-strike pitch attitude of the non-refueling airplane.

20 Claims, 9 Drawing Sheets

(58) Field of Classification Search
USPC .............................................. 244/135 A, 109
See application file for complete search history.

(56) References Cited

U.S. PATENT DOCUMENTS

| | | | | |
|---|---|---|---|---|
| 2,960,295 A * | 11/1960 | Schulze | ................ | B64D 39/00 244/135 A |
| 3,055,620 A * | 9/1962 | Weiland | ................ | B64C 1/1415 244/135 A |
| 4,072,283 A * | 2/1978 | Weiland | ................ | B64D 39/00 141/387 |
| 4,129,270 A * | 12/1978 | Robinson | ............... | B64D 39/00 141/387 |
| 4,586,683 A * | 5/1986 | Kerker | ................... | B64D 39/00 244/135 A |
| 4,736,910 A * | 4/1988 | O'Quinn | ............... | B64C 1/0009 244/118.2 |
| 4,815,678 A * | 3/1989 | Gawne | ................... | B64C 25/00 244/100 R |
| 5,996,939 A * | 12/1999 | Higgs | ..................... | B64D 39/02 244/135 A |
| 7,036,770 B2 | 5/2006 | Shelly et al. | | |
| 7,185,854 B2 * | 3/2007 | Von Thal | ............... | B64D 39/02 244/135 A |
| 7,909,287 B2 * | 3/2011 | Guering | ................ | B64C 39/02 244/118.1 |
| 8,371,530 B2 * | 2/2013 | Bautista De La Llave | ................ | B64C 1/061 244/109 |
| 8,911,236 B2 * | 12/2014 | Gasco Nunez | .......... | G09B 9/05 244/135 A |
| 2004/0200930 A1 * | 10/2004 | Bays-Muchmore | .... | B64C 25/00 244/109 |
| 2006/0000950 A1 * | 1/2006 | Von Thal | ............... | B64D 39/02 244/135 A |
| 2006/0102791 A1 * | 5/2006 | Adelson | ................ | B64D 39/06 244/135 A |
| 2007/0215753 A1 * | 9/2007 | Schuster | ................ | B64D 39/04 244/135 A |
| 2008/0302916 A1 * | 12/2008 | Speer | ..................... | B64D 39/00 244/135 A |
| 2010/0270431 A1 * | 10/2010 | Mouskis | ................ | B64D 39/04 244/135 A |
| 2010/0327116 A1 * | 12/2010 | De Miguel | ............ | B64D 39/00 244/135 A |
| 2012/0043423 A1 * | 2/2012 | Richardson, Jr. | ...... | B64D 39/00 244/135 A |
| 2012/0049003 A1 | 3/2012 | Richardson | | |
| 2012/0104171 A1 * | 5/2012 | Martinez Vazquez | ...................... | B64D 39/04 244/135 A |

* cited by examiner

| Model | Flaps | Liftoff Attitude (degrees) | Minimum Tail Clearance inches (cm) | Tail Strike Pitch Attitude (degrees) |
|---|---|---|---|---|
| 767-200 | 1<br>5<br>15<br>20 | 11.1<br>11.1<br>9.1<br>9.1 | 25(64)<br>25(64)<br>33(84)<br>36(91) | 13.1 |
| 767-300 | 5,15,20 | 7.5 | 24(61) | 9.6 |
| 767-400 | 5,15,20 | 6.9 | 32(81) | 13.1 |

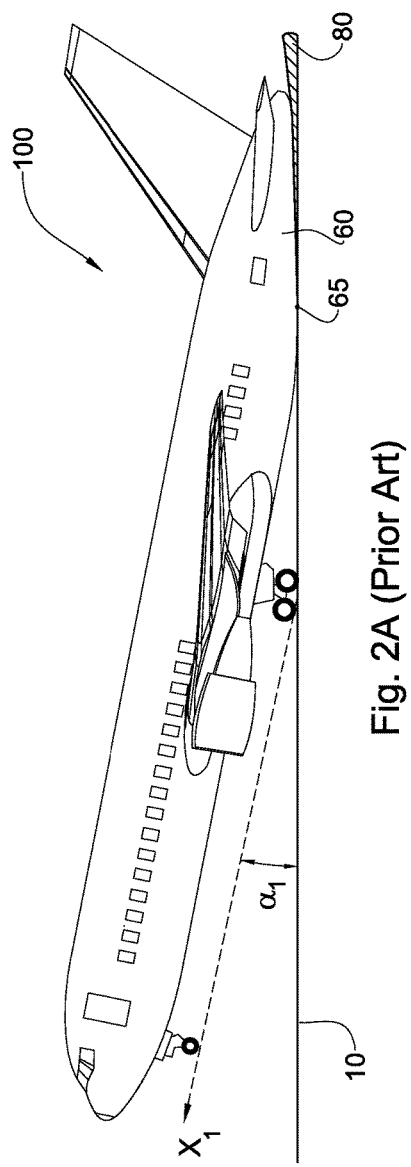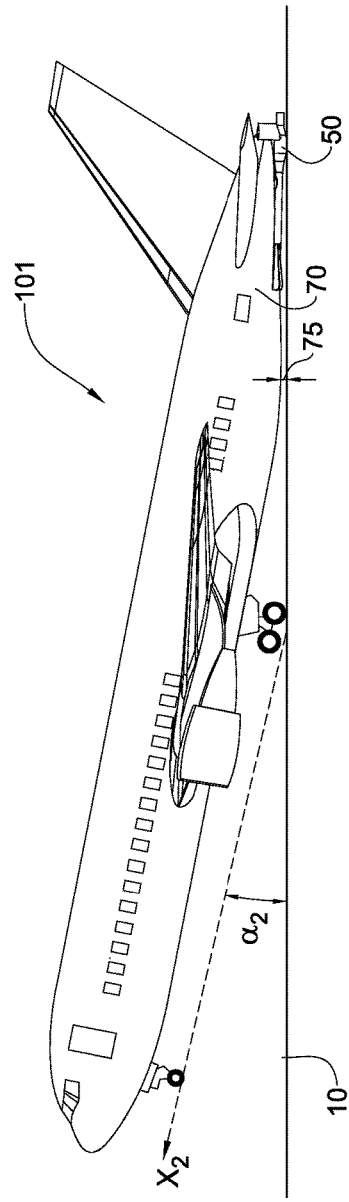

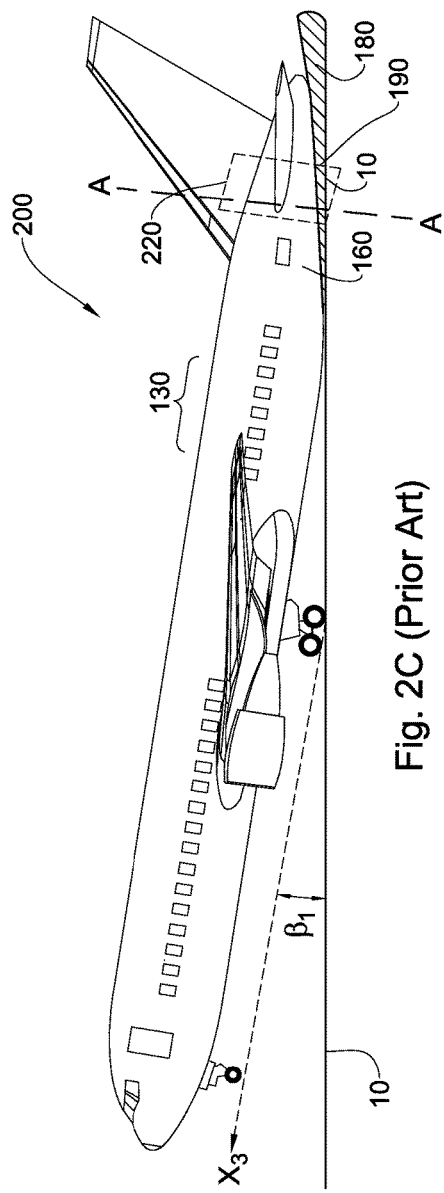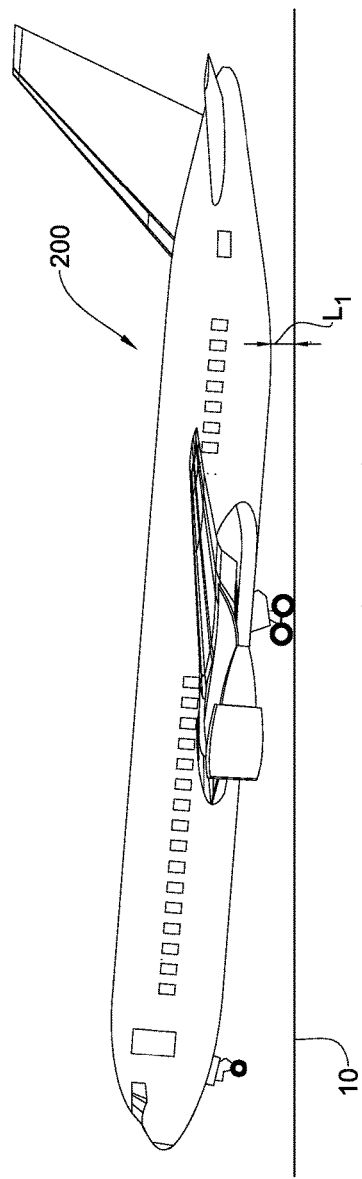

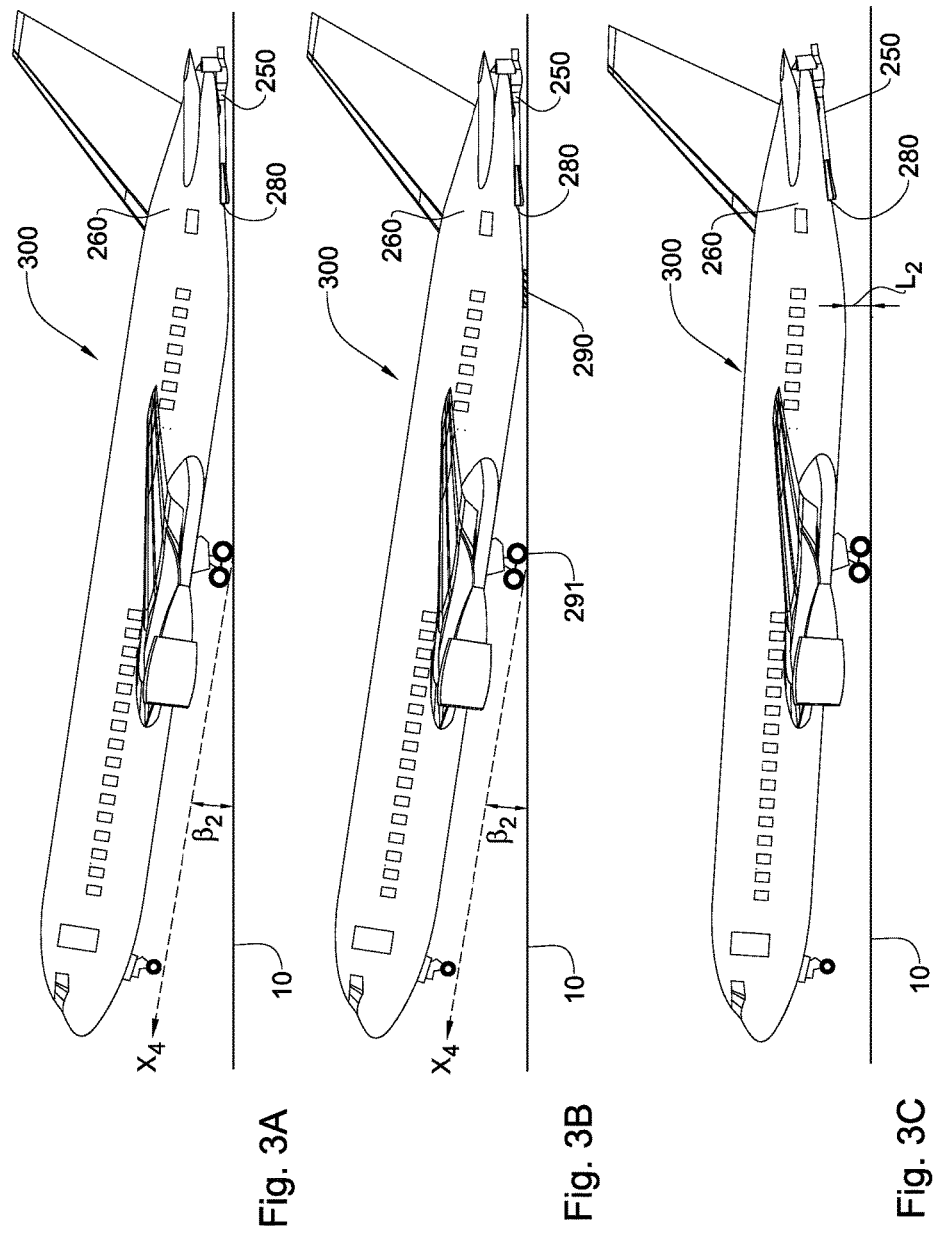

SYSTEM AND METHOD OF AIRPLANE CONVERSION FOR IN-FLIGHT REFUELING

TECHNICAL FIELD

The presently disclosed subject matter relates in general to the field of refueling airplanes. In particular, the presently disclosed subject matter relates to refueling airplanes that are converted from other types of airplanes, such as passenger airplanes.

BACKGROUND

Aerial refueling is a process of transferring fuel from one aircraft (the tanker airplane or the refueling airplane) to another airplane (the receiving airplane) during flight. The procedure allows the receiving aircraft to remain airborne longer, extending its range or loiter time on station.

Refueling airplanes can either be originally manufactured as refueling planes (i.e. the original purpose of the airplane is to serve as a refueling airplane), or alternatively, be converted from an existing airplane originally intended to serve a different purpose, e.g. a passenger airplane.

An example of a refueling airplane that is originally manufactured as a refueling airplane is the military aerial refueling and strategic transport aircraft Boeing KC-767 developed by Boeing from its B767-200 jet airliner.

An example of a refueling airplane converted from a passenger airplane is the B767 Multi-Mission Tanker Transport (MMTT) that was converted by Israel Aerospace Industries from secondhand B767-200ER airplane.

A known parameter related to the take-off and the landing attitudes of airplanes is a tail-strike pitch attitude that is defined as a critical attitude between a longitudinal axis of the airplane and the ground line, at which the tail section of the airplane contacts and strikes the ground. Such a strike can happen if the attitude of the airplane is equal to or above the tail-strike pitch attitude during take-off or landing of the airplane. Therefore, when operating the airplane during take-off or landing, the pilot has to pay attention that the attitude of the airplane is below the tail-strike pitch attitude, so as to prevent a tail-strike event.

Tail strike is an aviation term that describes an event in which the rear end of an aircraft strikes the runway. This can happen during takeoff of an affixed-wing aircraft if the pilot pulls up too rapidly, leading to the tail of the airplane's body touching the runway. It can also occur during landing if the pilot raises the nose too aggressively.

FIG. 1A illustrates a typical take-off procedure of an airplane, and FIG. 1B illustrates a table including data taken from flight manuals of different airplane models such as: B767-200, B767-300 and B767-400, and their corresponding flight parameters, such as: Liftoff Attitude, Minimum tail clearance and Tail Strike Pitch Attitude (discussed above). The Liftoff Attitude is the preferred attitude of the airplane at which the airplane should take-off, and the Minimal Tail Clearance, which is shown in FIG. 2B, is the minimal distance between the lowermost point of the airplane's tail section and the ground during take-off. A tail clearance below the minimum tail clearance can result in tail-strike.

In order to prevent tail-strikes during take-off of the airplane, the pilot has to follow flight performance and operation procedures related to parameters such as: a pitch rate, a decision speed (V1), rotation speed ($V_R$) and a take-off speed ($V_{LOF}$). The pitch rate is the rate at which the yoke of the airplane is pulled. The decision speed (V1) is a calibrated airspeed on the ground at which, as a result of engine failure or other reasons, the pilot assumed to have made a decision to continue or discontinue the takeoff. The rotation speed (VR) is the speed at which the aircraft's nosewheel leaves the ground. The take-off speed ($V_{LOF}$) is the speed of the airplane at which it leaves the ground. By following the flight performance and operation instructions, the values of the Liftoff Attitude, the Minimal Tail Clearance, and Tail Strike Pitch Attitude can be controlled, and a tail-strike can be prevented accordingly.

SUMMARY OF THE PRESENTLY DISCLOSED SUBJECT MATTER

The presently disclosed subject matter, in its one aspect, provides a refueling airplane converted from a non-refueling airplane having an original tail section and an original tail-strike pitch attitude. The refueling airplane comprises said original tail section and a recess formed therein, both constituting a modified tail section. The recess is configured to at least partially accommodate therewithin a refueling boom. The refueling boom is configured to be mounted to the modified tail section, such that a tail-strike pitch attitude of the refueling airplane, when the refueling boom is mounted thereto, is equal to or greater than the original tail-strike pitch attitude of the non-refueling airplane.

The recess that is formed in the modified tail section, can eliminate protrusion of the refueling boom out of the airplane's tail section toward the ground to a predetermined extent, and thereby prevents decrease of the tail-strike pitch attitude of the refueling airplane relative to the tail-strike pitch attitude of the non-refueling airplane.

The recess that is formed in the modified tail section can eliminate protrusion of a lower part of the refueling boom out of a lower portion of a space formed between the airplane's tail section and the ground, in a tail-strike position of the airplane, and thereby prevents decrease of the tail-strike pitch attitude of the refueling airplane, relative to the tail-strike pitch attitude of the non-refueling airplane.

By providing a refueling airplane having the tail-strike pitch attitude, being equal to the original tail-strike pitch attitude of the non-refueling airplane, parameters such as: Liftoff Attitude, Minimum tail clearance and Tail Strike Pitch Attitude of the refueling airplane can be identical in both airplanes. Moreover, the recess that is formed in the tail section of the refueling airplane can provide space to the refueling boom of the refueling airplane thereby preserving flight performance and operation instructions of the non-refueling airplane, including at least: a take-off attitude, a landing attitude, a pitch rate, a decision speed (V1), a rotation speed ($V_R$) and a take-off speed ($V_{LOF}$).

The non-refueling airplane can have an original minimum tail clearance and the refueling airplane can have a modified minimum tail clearance when the refueling boom is mounted thereto. In addition to the above, the space provided by the recess for the refueling boom is configured for compensating a decrease in the modified minimum tail clearance of the refueling airplane relative to the original minimum tail clearance of the non-refueling airplane.

The modified minimum tail clearance can be equal to or greater than the original minimum tail clearance of the non-refueling airplane.

The non-refueling airplane, in a tail-strike position thereof, can be characterized by an original vertical distance between a ground line and a set of lowermost points along the periphery of the original tail section. The refueling airplane, in a tail-strike position thereof, can be characterized by a modified vertical distance between the ground line and the lower most points along the periphery of the modified tail section, with the refueling boom mounted thereto, such that at the region of the recess, the modified vertical distance is greater than or equal to the original vertical distance.

The difference between the original vertical distance and the modified vertical distance at the region of the recess can be corresponding to the compensation of the distance decrease in the modified minimum tail clearance of the refueling airplane relative to the original minimum tail clearance.

The recess can constitute a part of the modified tail-portion. The original tail section can comprise an original tail-portion, and the modified tail section can comprise a modified tail-portion including the recess. According to this aspect, the modified tail-portion includes substitute structural elements replacing original structural elements of the original tail-portion.

The original structural elements and the substitute structural elements can include at least one of the following: ribs, stringers and an airplane envelope enclosing the same.

The envelope volume of the modified tail-portion can be less than the envelope volume of the original tail-portion.

The recess can be defined by a bottom surface and a side surface, and an angle therebetween. The angle can be obtuse.

The refueling airplane can further comprise a tail skid mounted between the refueling boom and a main landing gear of the refueling airplane.

The refueling boom can be configured for being at least partially accommodated within the recess via a pivot mechanism. The pivot mechanism can be disposed between the frames of the modified tail-portion of the refueling airplane (e.g., between two specific frames of the modified tail-portion).

The presently disclosed subject matter, in its another aspect, provides a method for converting a non-refueling airplane to an airplane suitable for constituting a refueling airplane. The non-refueling airplane has an original tail section and an original tail-strike pitch attitude. The method comprises steps of:

providing said original tail section and a recess formed therein, both constituting a modified tail section;

at least partially accommodating a refueling boom within the recess; and mounting the refueling boom to the modified tail section, thereby obtaining refueling airplane a tail-strike pitch attitude of which is equal to or greater than the original tail-strike pitch attitude of the non-refueling airplane.

The step of providing said original tail section and a recess formed therein can be performed by forming the recess in the original tail section.

The formation of the recess can be performed by various techniques. Such a technique can be performed by replacing an original tail-portion of the original tail section with a modified tail-portion of the modified tail section, such that the modified tail-portion includes the recess.

The step of providing said original tail section and a recess formed therein can also be performed by replacing original structural elements of the original tail section with substitute structural elements forming the recess.

The method can further comprise a step of mounting a skid plate between the refueling boom and main landing gears of the refueling airplane.

The method can further comprise a step of at least partially accommodating the refueling boom within the recess via a pivot mechanism.

BRIEF DESCRIPTION OF THE DRAWINGS

In order to understand the invention and to see how it can be carried out in practice, embodiments will now be described, by way of non-limiting examples only, with reference to the accompanying drawings, in which:

FIGS. 2A and 2B are schematic side views of a known non-refueling airplane, and a refueling airplane to which the non-refueling airplane was converted;

FIGS. 2C and 2D are schematic side views of a known non-refueling airplane converted to a refueling airplane according to the method of the presently disclosed subject matter;

FIGS. 3A to 3C are a schematic side view of a refueling airplane that was converted from the non-refueling airplane shown in FIGS. 2A to 2D, according to the method of the presently disclosed subject matter;

DETAILED DESCRIPTION OF EMBODIMENTS

Figures 1A, 1B:
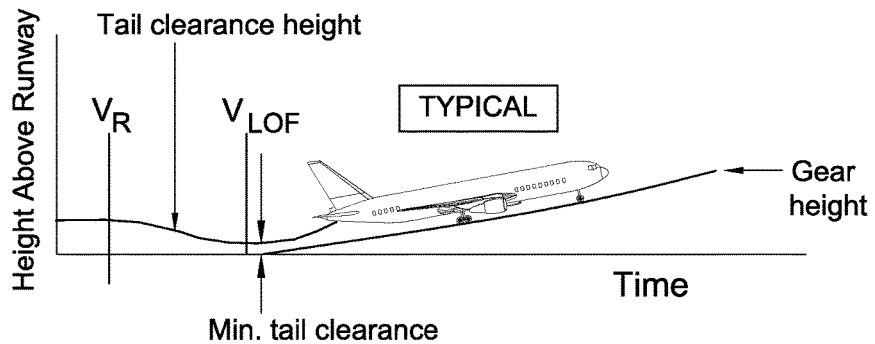
FIG. 1A is a schematic illustration of a typical take-off procedure of an airplane presented on a graph of Height Above Runway Vs. Time.
FIG. 1B. is a schematic table including data taken from flight manuals of different airplane models and their corresponding flight parameters.

Reference is first made to FIGS. 2A and 2B which schematically illustrate an example of a known non-refueling airplane 100 (e.g., B767-200 ER) and of a known refueling airplane 101 (e.g., B767-200 Multi-Mission Tanker Transport [MMTT] by Israel Aerospace Industries) converted from the non-refueling airplane 100 for performing refueling operations. These operations involve transferring fuel from the refueling airplane 101 to a receiving airplane (not shown) via a refueling boom 50 mounted to the refueling airplane 101. In order to perform the above conversion, several known modifications were made on the non-refueling airplane 100. These modifications include for example removing passenger seats from the non-refueling airplane 100, inserting fuel tanks into the interior of the non-refueling airplane 100 and mounting a refueling boom 50 to a tail section 60 of non-refueling airplane 100.

FIGS. 2A and 2B also illustrate examples of tail-strike pitch attitudes $\alpha_1$ and $\alpha_2$ of the non-refueling airplane 100 and of the refueling airplane 101, respectively. The tail-strike pitch attitude $\alpha_1$ of FIG. 2A is defined between a ground line 10 and a longitudinal axis $X_1$ parallel to the main longitudinal axis of the airplane, and as shown in this figure, at this position of the non-refueling airplane 100, a tail section 60 of the airplane contacts the ground at a strike location 65. In a respective manner, the tail-strike pitch attitude $\alpha_2$ of FIG. 2B is defined between a ground line 10 and a longitudinal axis $X_2$ parallel to the main longitudinal axis of the airplane, and as shown this figure, at this position, a tail section 70 of the refueling airplane 101 contacts the ground at a strike location 75.

Due to the fact that the non-refueling airplane 100, when positioned at the tail-strike pitch attitude $\alpha_1$ (as shown in FIG. 2A), has enough space 80 for accommodating the refueling boom 50 therein, allowing mounting thereon a refueling boom without significantly affecting flight parameters. Therefore, the tail-strike pitch attitudes $\alpha_1$ and $\alpha_2$ of the non-refueling and the refueling airplanes 100 and 101 are similar. This means, that the pilot of the refueling airplane 101 does not have to change flight performance and operation procedures related, for example, to the attitude of the airplane, and therefore, can continue using the flight instruction related to the non-refueling airplane 100 without any significant change.

Turning now to FIG. 2C, in which a non-refueling airplane 200 is shown (e.g., B767-300) having a different geometry and flight parameters than the non-refueling airplane 100. According to the present example, the non-refueling airplane 200, is a longer version of the non-refueling airplane 100, the middle section of which was lengthened. As shown in FIG. 2C, the non-refueling airplane 200 has a tail-strike pitch attitude $\beta_1$ that is defined as the angle between the ground line 10 and a longitudinal axis $X_3$ parallel to the main longitudinal axis of the airplane. As a result of this lengthening, the tail-strike pitch attitude $\beta_1$ of the non-refueling airplane 200 is smaller than the tail-strike pitch attitude $\alpha_1$ (as shown in FIG. 1B), and the non-refueling airplane 200 has a different structure of a space 180 between its tail section and the ground, when the section is in contact with the ground line 10. The non-refueling airplane 200 additionally includes an optional tail skid which is configured to absorb energy in an event of a tail strike on takeoff or landing of the airplane.

FIG. 2D illustrates the non-refueling airplane 200 in a position in which its tail clearance is in a minimum tail clearance $L_1$. Take-off of the airplane with a tail clearance with a value smaller than $L_1$, can result in tail strike if the tail section of the airplane is too close to the ground line 10.

In order to convert the non-refueling airplane 200 to a refueling airplane, as it is done with the non-refueling airplane 100, a refueling boom such as the refueling boom 50, has to be mounted to the non-refueling airplane 200, and a modification of airplane's tail section has to be performed as detailed below.

Reference is now made to FIGS. 3 to 8 which schematically illustrate a refueling airplane 300 according to one example of the presently disclosed subject matter. According to this example, the refueling airplane 300 is an airplane that was converted from the non-refueling airplane 200 to enable it performing refueling operations via a refueling boom 250 mounted thereto. This conversion involves modification of the original tail section 160 of the non-refueling airplane 200 to a modified tail section 260 having a recess 280 formed therein. The recess 280 is configured to provide space to a portion 266 (shown in FIG. 5A) of the refueling boom 250, when accommodated therein.

Due to the fixed dimensions of the refueling booms 50 and 250, that are similar to each other, it is estimated that mounting the refueling boom onto the non-refueling airplane 300 may entail protrusion of a lower part of the refueling boom out of a lower portion of the space 180 (FIG. 2C), that will lead to decrease of the tail-strike pitch attitude of the non-refueling airplane when the refueling boom is mounted thereto. This decrease in the airplane's tail-strike pitch attitude, when the refueling boom is mounted to the tail section of the airplane, depends on the structure of the airplane's tail section, the length of the tail section, the distance between the main landing gears of the airplane and the tail section, and the distance between the tail section of the airplane and the ground when the airplane is in its inoperative position. As it is clearly shown in the figures, and explained above, due to the difference in length of the non-refueling airplanes 100 and 200, the geometrical structure of the space 180 is different from the geometrical structure of the space 80. This difference leads to the above protrusion of the refueling boom out of a lower portion of the space 180.

The recess 280 that is formed in the modified tail section 260 eliminates the above protrusion of the lower part of the refueling boom 250 out of a lower portion of the space 180 and thereby prevents decrease of the tail-strike pitch attitude in of the refueling airplane 300, relative to the tail-strike pitch attitude of the non-refueling airplane.

In other words, the recess 280 compensates the decrease of the tail-strike pitch attitude of the refueling airplane 300 by accommodating a portion of the refueling boom 250 within the recess 280, such that a tail-strike pitch attitude $\beta_2$ (shown in FIGS. 3A-B) of the refueling airplane 300 is not less than to the original tail-strike pitch attitude $\beta_1$ of the non-refueling airplane 200. The value of these tail-strike pitch attitudes can be equal to 9.6°. The tail-strike pitch attitude $\beta_2$ is defined as the angle between the ground line 10 and a longitudinal axis $X_4$.

By providing a refueling airplane 300 having the tail-strike pitch attitude $\beta_2$, being equal to the original tail-strike pitch attitude $\beta_1$ of the non-refueling airplane 200, parameters such as: Liftoff Attitude, Minimum tail clearance and Tail Strike Pitch Attitude of the refueling airplane 300 are identical in both airplanes. As a result of that, the pilot of the refueling airplane 300 can operate this airplane according to flight performance and operation procedures related to parameters such as: a pitch rate, a decision speed (V1), rotation speed ($V_R$) and a take-off speed ($V_{LOF}$), in a similar manner to the operation of the refueling airplane 200.

Reference is now made to FIG. 3C which illustrates the refueling airplane 300 in a position in which its tail clearance is in a modified minimum tail clearance $L_2$. As a result of the formation of the recess 280, and the partial accommodation of the refueling boom 250 therein, a space is provided to a portion of the refueling boom 250, so as to compensate decrease of the modified minimum tail clearance $L_2$ when the refueling boom 250 is mounted thereto.

Due to the structure of the recess 280 according to present example, the modified minimum tail clearance $L_2$ is at least as the original minimum tail clearance $L_1$. Therefore, according to an example in which the refueling airplane 300 is the B767-300, its original minimum tail clearance $L_1$ and its modified minimum tail clearance $L_2$, according to the table of FIG. 1A, equal to 24 inches. According to other examples, the original minimum tail clearance of the non-refueling airplane can be greater than 24 inches.

Figure 4A:
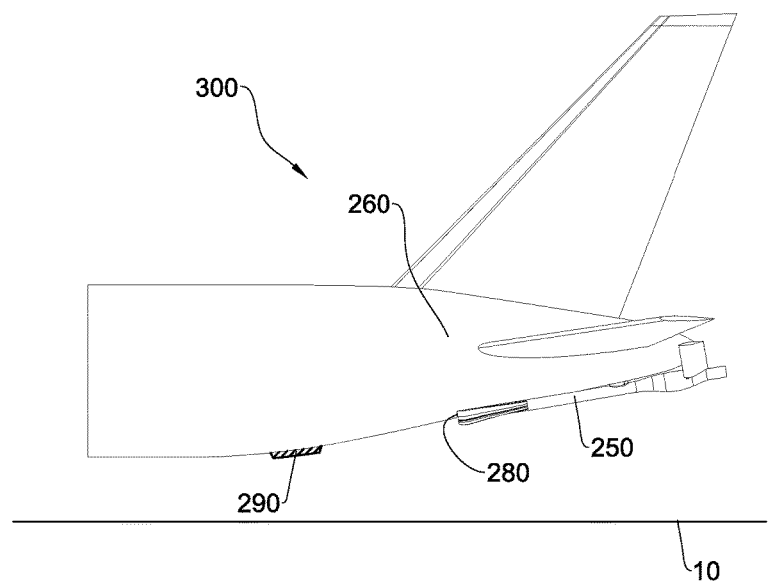
FIGS. 4A and 4B are schematic side views of a tail section of the refueling airplane shown in FIGS. 3A to 3C.
Figure 4B:
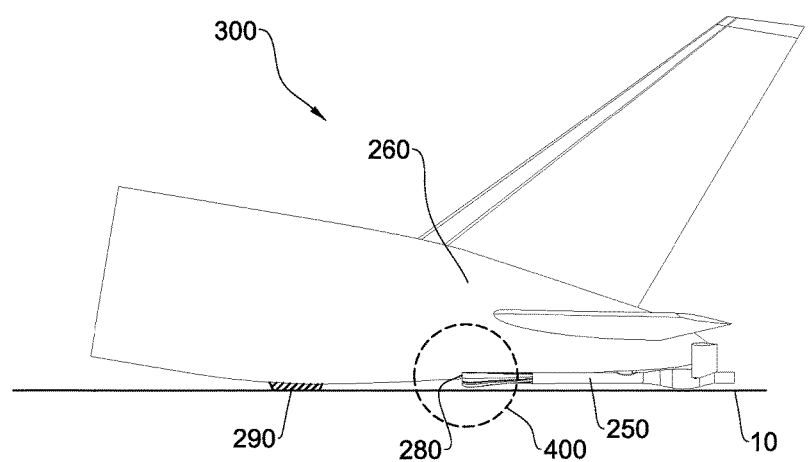

As shown in FIGS. 3B and 4A and 4B, the refueling airplane 300 can additionally comprise a tail skid 290 which replaces the tail skid 190 of the non-refueling airplane 200. The tail skid 290 is mounted between the refueling boom 250 and main landing gears 291 of the refueling airplane 300.

Figure 5A:
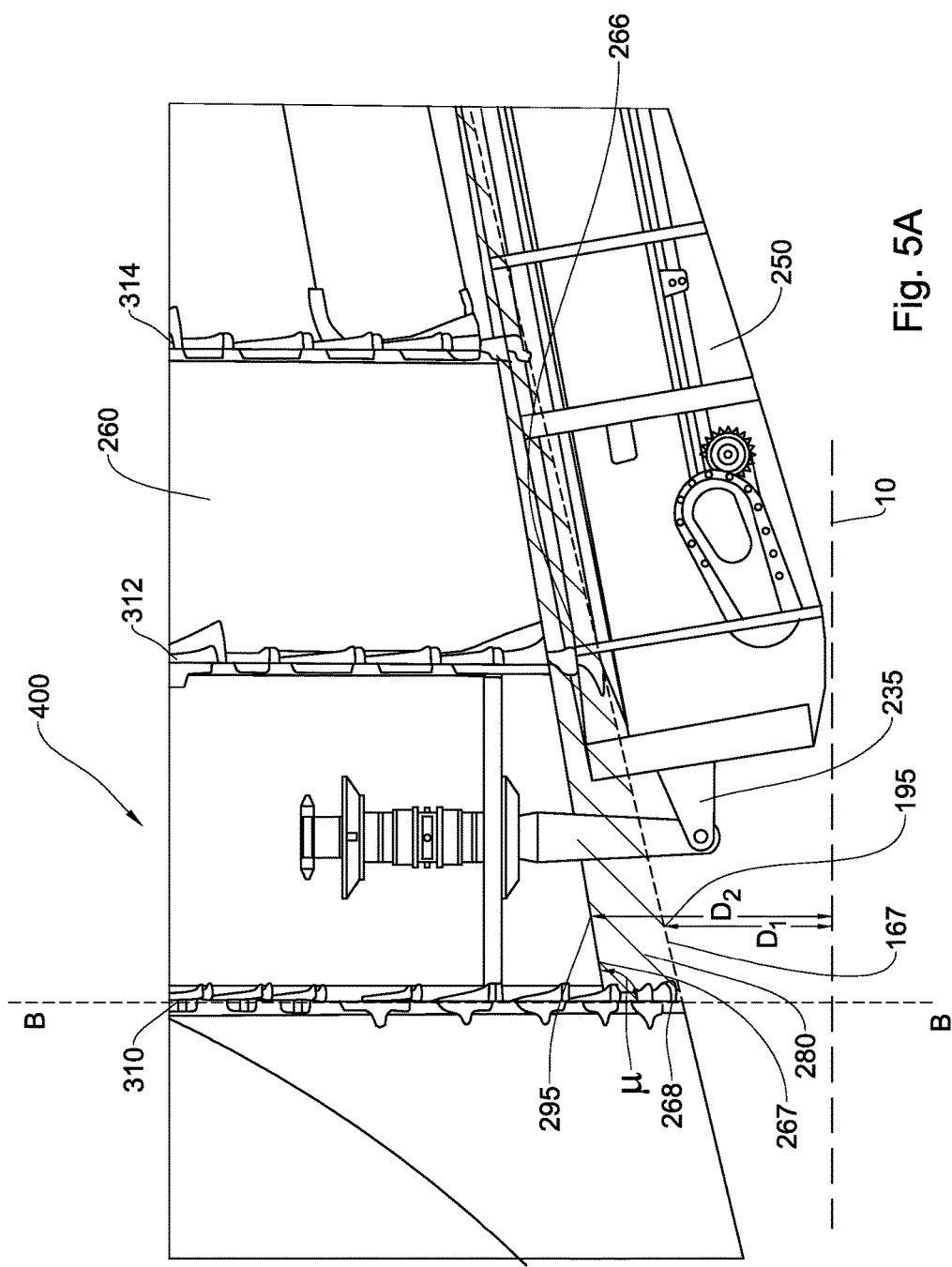
FIG. 5A is a schematic enlarged side view of a bottom section of the refueling airplane's tail section in FIGS. 4A to 4C.

Reference is now made to FIG. 5A, which schematically illustrates an enlarged view of section 400, which is marked in FIG. 4B by a broken line. FIG. 5A clearly shows the structure of a part of the recess 280 formed in the modified tail portion 260. In this figure, the airplane is in a tail-strike position, in which it is in contact with the ground 10. The recess 280 is defined by a bottom surface 267 and a side surface 268, and an angle µ therebetween, which is obtuse. In FIG. 5A also illustrated a cross-sectional view of an imaginary surface 167 which represents the part of the envelope of the original tail section 160 that was modified. According to the present example, the area between the bottom surface 267 and the imaginary surface 167 is the compensated area that allows preserving the minimum tail clearance of the airplane $L_2$ and the tail-strike pitch attitude $\beta_2$ to be identical to those of the non-refueling airplane 200. FIG. 5A also illustrates an original vertical distance $D_1$ and a modified vertical distance $D_2$. The original vertical distance $D_1$ is defined between the ground line 10 and lowermost points along the periphery of the original tail section 160, such as such as a lowermost point 195 that is disposed at the imaginary surface 167. The modified vertical distance $D_2$ is defined between the ground line 10 and lowermost points along the periphery of the modified tail section 260, such as such as a lowermost point 295 that is disposed at the bottom surface 267. As shown is FIG. 5A, at the region of the recess 280, the modified vertical distance $D_2$ is greater than the original vertical distance $D_1$. The difference between the original vertical distance $D_1$ and the modified vertical distance $D_2$ at the region of the recess 280 is corresponding to the compensation of the distance decrease in the modified minimum tail clearance of the refueling airplane.

Figure 5B:
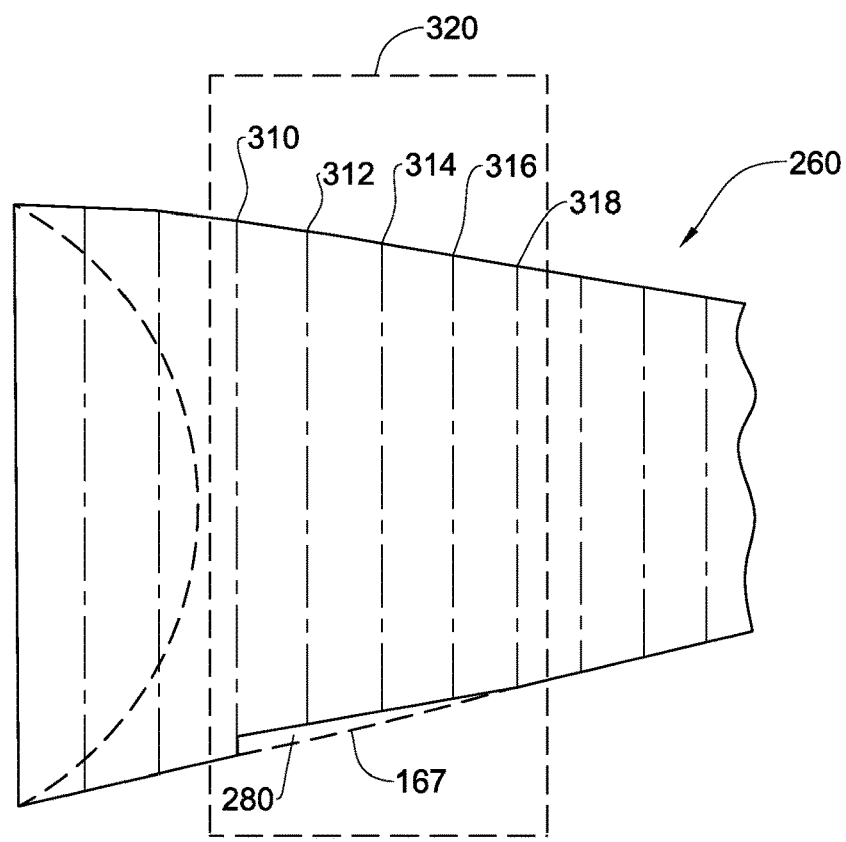
FIG. 5B is a schematic cross-sectional side view of a bottom section of the refueling airplane's tail section taken along a vertical plane including a central longitudinal axis of the airplane.
Figure 6A:
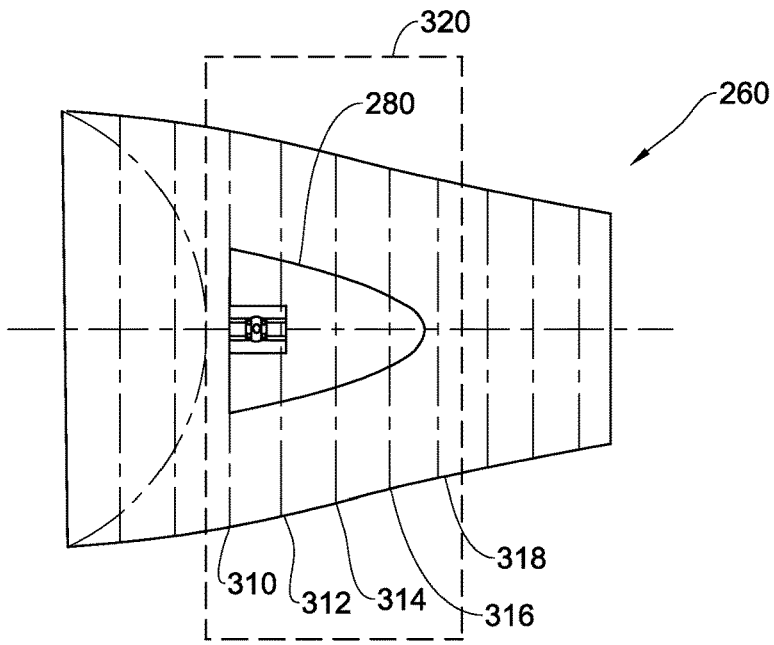
FIG. 6A and 6B is schematic bottom view of the refueling airplane's modified tail section, shown in FIGS. 4A and 4B according to the presently disclosed subject matter.
Figure 6B:
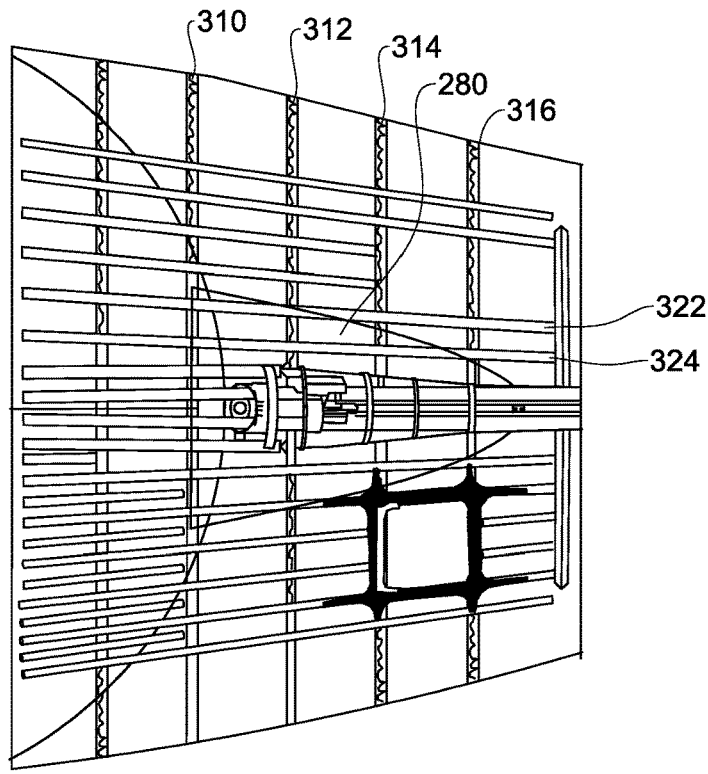

Reference is made to FIG. 5B and 6A which schematically illustrate a side view and a bottom view, respectively, of the modified tail section 260. The modified tail section 260 includes a modified tail-portion 320 constructed of a plurality of substitute structural elements including, for example, frames 310, 312, 314, 316 and 318 forming the structure of the recess 280. The frames 310, 312 and 314 are also shown in FIG. 5A. As shown in FIG. 6B, the substitute structural elements additionally include struts, for example, struts 322 and 324 that also form the structure of the recess 280. The substitute structural elements additionally include an envelope that encloses the frames and the struts, and form the outer structure of the modified tail-portion 320. During the conversion of the non-refueling airplane 200 to the refueling airplane 300, an original tail-portion 220 (shown in FIG. 2C) of the original tail section 160 is replaced with the modified tail-portion 320 that includes the recess 280. By this modification of the original tail section 160, the substitute structural elements replace a plurality of original structural elements of the original tail-portion 220, which also include ribs, struts and an envelope enclosing them. The modified tail-portion 320 is structure such that its volume is less than the volume of the original tail-portion 220.

As shown in FIG. 5A, the refueling boom 250 is accommodated within the recess 280 via a pivot mechanism 235. The pivot mechanism is installed between the two frames 310 and 312 of the modified tail-portion 320 of the refueling airplane 300.

Figure 5C:
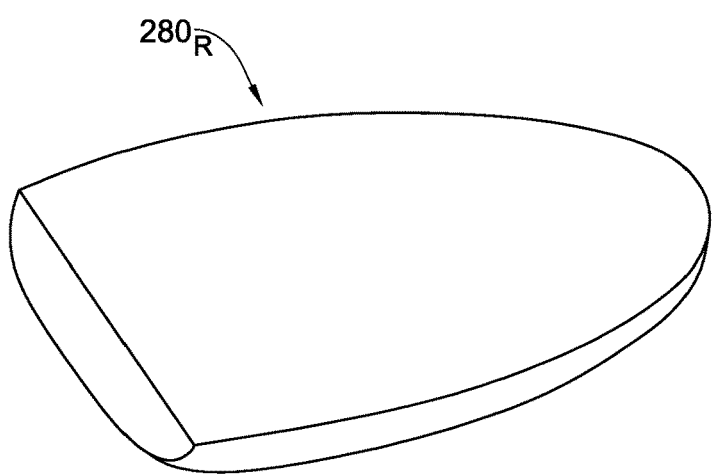
FIG. 5C is a schematic prospective view of the structure of the space provided by the recess of the presently disclosed subject matter.

FIG. 5C schematically illustrates a side view of the structure of a space 280R which the recess 280 provides to the refueling airplane 300.

Figure 7:
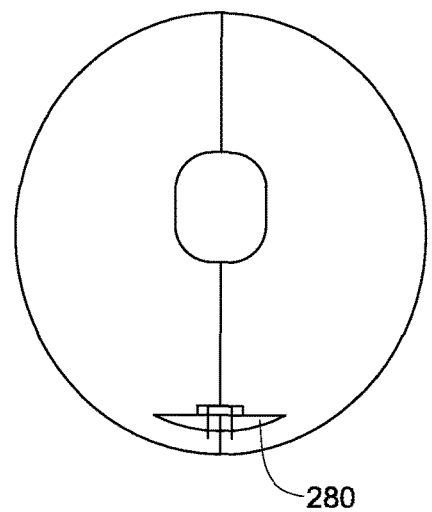
FIG. 7 is a schematic rear view of the refueling airplane's modified tail section shown in FIGS. 4A and 4B, according to the presently disclosed subject matter.

FIG. 7 schematically illustrates a rear view of the modified tail section 260 in which the recess 280 is shown.

Figure 8:
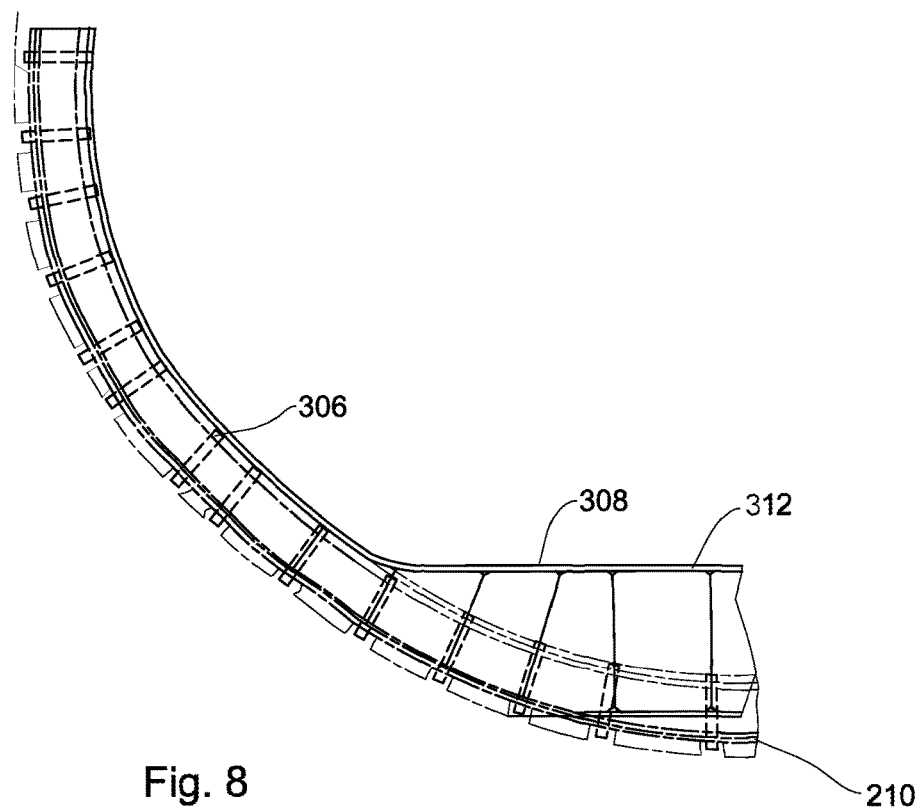
FIG. 8 is a schematic partial cross-sectional view of the refueling airplane's modified tail section and of the non-refueling airplane's original tail section taken along a plane AA of FIG. 2C and a plane BB of FIG. 5B according to the presently disclosed subject matter.

FIG. 8 schematically illustrates the rib 312 that is part of the modified tail-portion 320, and a rib 210 of the original tail-portion 220. In the modification of original tail section 260, the rib 210 which has a rounded shape, is replaced by the rib 312 which has a rounded section 306 and a straight section 308 extending at the lower part of the modified tail section, in the region of the recess 280.

The invention claimed is:

1. A refueling airplane converted from a non-refueling airplane having an original tail section and an original tail-strike pitch attitude, said refueling airplane comprising:
said original tail section having a cutout formed therein, both of which constitute a modified tail section, said cutout extending inwardly from an outside of said original tail section, said cutout at least partially defined by a flat bottom surface and at least one sidewall that is formed by a portion of at least one rib of a fuselage of the refueling airplane, the portion of the at least one rib extending below the flat bottom surface, said flat bottom surface constituting at least a portion of an outermost surface of the modified tail section, said flat bottom surface extending along said modified tail section directly underneath at least a portion of a vertical stabilizer of said refueling airplane, said cutout being configured to at least partially accommodate therewithin a refueling boom such that said refueling boom at least partially extends out of said cutout, said refueling boom being configured to be mounted to the modified tail section via a pivot mechanism protruding out of said modified tail section through said flat bottom surface, such that a tail-strike pitch attitude of the refueling airplane, when said refueling boom is mounted thereto, is equal to or greater than the original tail-strike pitch attitude of the non-refueling airplane.

2. The refueling airplane according to claim 1, wherein said non-refueling airplane has an original minimum tail clearance and said refueling airplane has a modified minimum tail clearance when said refueling boom is mounted thereto; wherein a space provided by the cutout for the refueling boom is configured for compensating a decrease in the modified minimum tail clearance of the refueling airplane relative to the original minimum tail clearance of the non-refueling airplane.

3. The refueling airplane according to claim 2, wherein said modified minimum tail clearance is equal to or greater than the original minimum tail clearance of the non-refueling airplane.

4. The refueling airplane according to claim 2, wherein said non-refueling airplane, in a tail-strike position thereof, is characterized by an original vertical distance between a ground line and a set of lowermost points along the periphery of said original tail section, and said refueling airplane, in a tail-strike position thereof, is characterized by a modified vertical distance between the ground line and the lowermost points along the periphery of said modified tail section, such that at the region of said cutout, said modified vertical distance is greater than or equal to the original vertical distance.

5. The refueling airplane according to claim 4, wherein the difference between the original vertical distance and the modified vertical distance at the region of said cutout is corresponding to the compensation of the distance decrease in the modified minimum tail clearance of the refueling airplane relative to the original minimum tail clearance.

6. The refueling airplane according to claim 1, wherein said original tail section comprises an original tail-portion, and said modified tail section comprises a modified tail-portion including said cutout, said modified tail-portion including substitute structural elements replacing original structural elements of the original tail-portion.

7. The refueling airplane according to claim 6, wherein said cutout is defined by a bottom surface and a side surface, and an angle therebetween.

8. The refueling airplane according to claim 1, wherein said cutout provides space to the refueling boom so as to preserve flight performance and operation procedures of the non-refueling airplane, including at least: a take-off attitude, a landing attitude, a pitch rate, a decision speed ($V_1$), a rotation speed ($V_R$) and a take-off speed ($V_{LOF}$).

9. A method of converting a non-refueling airplane to an airplane suitable for constituting a refueling airplane, said non-refueling airplane having an original tail section and an original tail-strike pitch attitude, said method comprising:
   providing said original tail section with a cutout, the original tail section and cutout both constituting a modified tail section, said cutout extending inwardly from an outside of said original tail section, said cutout at least partially defined by a flat bottom surface and at least one sidewall that is formed by a portion of at least one rib of a fuselage of the refueling airplane, the portion of the at least one rib extending below the flat bottom surface, said flat bottom surface constituting at least a portion of an outermost surface of the modified tail section, said flat bottom surface extending along said modified tail section directly underneath at least a portion of a vertical stabilizer of said refueling airplane;
   at least partially accommodating a refueling boom within the cutout such that said refueling boom at least partially extends out of said cutout; and
   mounting the refueling boom to the modified tail section via a pivot mechanism protruding out of said modified tail section through said flat bottom surface, to thereby obtain, in the refueling airplane, a tail-strike pitch attitude that is equal to or greater than the original tail-strike pitch attitude of the non-refueling airplane.

10. The method according to claim 9, wherein said providing said original tail section having a cutout formed therein is performed by forming said cutout in said original tail section.

11. The method according to claim 9, wherein said providing said original tail section having a cutout formed therein is performed by replacing an original tail portion of the original tail section with a modified tail portion including said cutout.

12. The method according to claim 10, wherein said providing said original tail section having a cutout formed therein is performed by replacing original structural elements of the original tail section with substitute structural elements forming said cutout.

13. The method according to claim 12, wherein said original structural elements and said substitute structural elements are at least one of: ribs, stringers, or an airplane envelope enclosing the same.

14. The method according to claim 11, wherein the envelope volume of the modified tail-portion is less than the envelope volume of the original tail-portion.

15. The method according to claim 9, wherein said non-refueling airplane has an original minimum tail clearance and said refueling airplane has a modified minimum tail clearance when said refueling boom is mounted thereto; wherein a space provided by the cutout for the refueling boom is configured for compensating a decrease in the modified minimum tail clearance of the refueling airplane, relative to the original minimum tail clearance of the non-refueling airplane.

16. The method according to claim 15, wherein said modified minimum tail clearance is equal to or greater than the original minimum tail clearance of the non-refueling airplane.

17. The method according to claim 15, wherein said non-refueling airplane, in a tail-strike position thereof, is characterized by an original vertical distance between a ground line a set of the lowermost points along the periphery of said original tail section, and said refueling airplane, in a tail-strike position thereof, is characterized by a modified vertical distance between the ground line and the lower most points along the periphery of said modified tail section, such that at the region of said cutout, said modified vertical distance is greater than or equal to the original vertical distance.

18. The method according to claim 17, wherein the difference between the original vertical distance and the modified vertical distance at the region of said cutout is corresponding to the compensation of the distance decrease in the modified minimum tail clearance of the refueling airplane relative to the original minimum tail clearance.

19. The method according to claim 9, wherein said cutout is defined by a bottom surface and a side surface, and an angle therebetween.

20. The method according to claim 19, wherein said angle is obtuse.

* * * * *